UNITED STATES PATENT OFFICE.

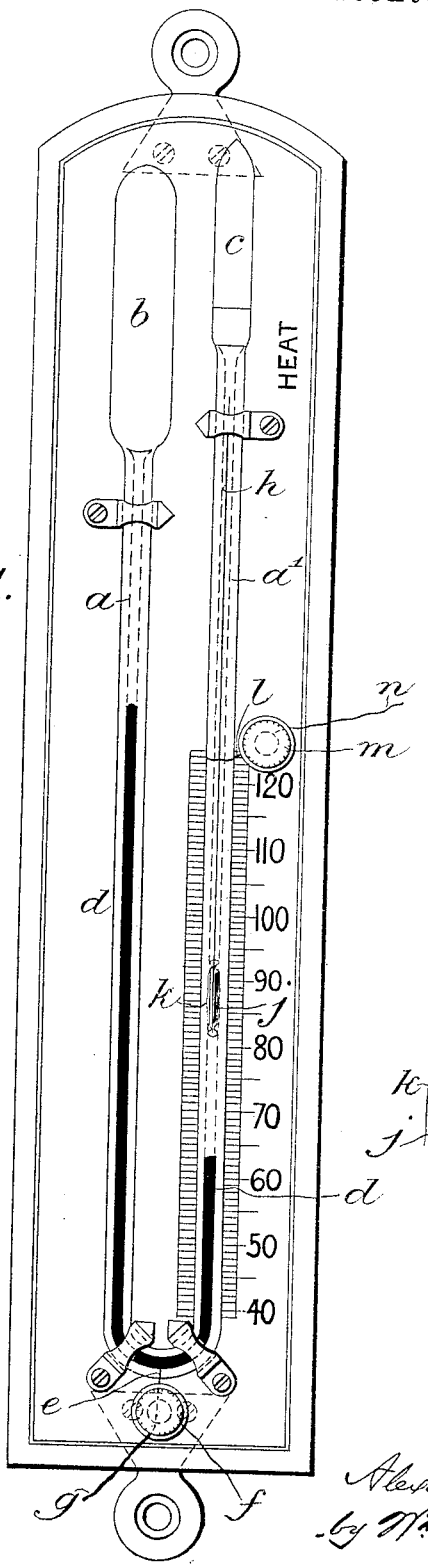

ALEXANDER LURASCHI, OF LONDON, ENGLAND, ASSIGNOR TO JAMES JOSEPH HICKS, OF SAME PLACE.

ELECTRICAL CIRCUIT-CLOSING THERMOMETER.

SPECIFICATION forming part of Letters Patent No. 584,382, dated June 15, 1897.

Application filed March 15, 1897. Serial No. 627,615. (No model.)

*To all whom it may concern:*

Be it known that I, ALEXANDER LURASCHI, a subject of the King of Italy, residing at London, England, have invented certain new and useful Improvements in Electrical Circuit-Closing Thermometers, of which the following is a full, clear, and exact description.

My invention relates to an improved electrical circuit-closing thermometer; and it has for its object to provide a closed thermometer with an adjustable terminal capable of being set so that the closing of the circuit will ensue upon the attainment of any given degree of temperature within the range of the instrument.

The invention relates particularly to the means of insuring permanent electrical contact between the movable and fixed parts of the conductor within the bore of the tube and to the mode of forming the movable terminal and insuring the fixity of its position after adjustment.

My invention is illustrated in the accompanying drawings, in which—

Figure 1 is a front view of an electrical circuit-closing maximum thermometer; and Fig. 2 is a view drawn to an enlarged scale of the movable terminal. Fig. 3 is a transverse section of tube $a'$ just above the wire $l$ and on a larger scale.

The thermometer represented in the drawings has bent tubes $a$ $a'$, a thermometric bulb $b$, and an expansion-bulb $c$, like an ordinary Six's thermometer. It is supplied with any suitable thermometric fluid and with a column of mercury $d$. The bend of the tubes $a$ $a'$ has fused therein a platinum conductor $e$, which crosses the bore and is sealed into the sides of the tube and is permanently in contact with the column of mercury. This conductor $e$ is connected with the binding-screw $f$, to which a conductor $g$ is also connected.

All the parts above referred to are well known and form no part of my invention.

The movable terminal $h$ within the tube $a'$ is formed of a length of very fine platinum wire passed through a casing $i$, formed by a short tube of glass inclosing a piece of steel wire $j$ and fused at both ends to and about the platinum wire $h$, so as to hermetically seal up the steel wire within it, the ends of the glass tube $i$ being provided with small knobs of glass $i'$ to act as guides for the terminal $h$ in its motion within the bore of the thermometer-tube. The lower end of the platinum wire $h$ projects from the lower knob $i'$ sufficiently to make contact with the mercury-column $d$ when the latter rises to the point at which the thermometer is set. A hair $k$ is tied about the glass tube $i$ to act as a spring, which by contact with the sides of the bore will retain the terminal $h$ in the position at which it has been set. The platinum wire $h$ above the glass casing $i$ is of a length to suit the range of adjustment required, and it makes contact with the external conductor by passing through a fine hole $l'$, Fig. 3, drilled transversely through a platinum wire $l$, which passes across the bore of the tube $a'$ and is sealed into the sides of the latter, the adjustment of the terminal $h$ being effected by means of a magnet acting through the tube $a'$ on the steel needle $j$, connected to the said terminal $h$. One end of the platinum wire $l$ is connected with the binding-screw $m$, to which the second conductor $n$ is also attached. Thus the platinum wire or terminal $h$, while capable of being freely adjusted within the tube $a'$, is always in contact with the external conductor $n$ by passing through the hole made in the cross-wire $l$, with which it is always in contact.

It will be evident that by applying the platinum cross-wire $l$ to the tube $a$ and by inserting the movable terminal $h$ within such tube $a$, in lieu of within the tube $a'$, the thermometer would act as an electrical circuit-closing minimum thermometer, while by applying a platinum cross-wire $l$ and a movable terminal $h$ to both tubes $a$ $a'$ the thermometer would become a combined maximum and minimum electrical circuit-closing thermometer.

I would further remark that although I have shown and described my invention as applied to double-tube thermometers of the character known as "Six's" it is equally applicable to a single-tube thermometer.

Having fully described my invention, what I desire to claim and secure by Letters Patent is—

1. In electrical circuit-closing thermometers, the combination of an adjustable movable terminal completely inclosed within the thermometer-tube, a perforated cross-wire through which such movable terminal passes, such cross-wire being sealed into the sides of the thermometer-tube by fusion, and a fixed terminal always in contact with the mercury, substantially as herein set forth.

2. In electrical circuit-closing thermometers, the combination of an adjustable movable terminal completely inclosed within the thermometer-tube, a short glass tube through which the movable terminal is passed and which is sealed at each end to such terminal, a steel needle within such glass tube, a perforated cross-wire through which the movable terminal freely passes and with which it makes contact, such cross-wire being fused into the thermometer-tube and having one end extending outside the tube to connect with an external conductor, and a fixed terminal always in contact with the mercury, substantially as herein set forth.

A. LURASCHI.

Witnesses:
 CLAUDE K. MILLS,
 WM. GIRLING.